United States Patent
Ubert et al.

[11] Patent Number: 5,928,694
[45] Date of Patent: Jul. 27, 1999

[54] PROCESS FOR PREPARING FOODSTUFFS IN A HOT AIR OVEN

[75] Inventors: Harald Ubert, Raesfeld; Joachim Barthel, Reken, both of Germany

[73] Assignee: Ubert Gastrotechnik G.m.b.H., Raesfeld, Germany

[21] Appl. No.: 08/652,563

[22] PCT Filed: Oct. 9, 1995

[86] PCT No.: PCT/EP95/03970

§ 371 Date: Aug. 8, 1996

§ 102(e) Date: Aug. 8, 1996

[87] PCT Pub. No.: WO96/10926

PCT Pub. Date: Apr. 18, 1996

[30] Foreign Application Priority Data

Oct. 10, 1994 [DE] Germany ............... 44 36 035

[51] Int. Cl.⁶ .................................... A23L 1/00
[52] U.S. Cl. .................. 426/233; 426/510; 426/467; 426/523
[58] Field of Search ................ 426/510, 511, 426/523, 467, 233; 99/427; 126/21 A

[56] References Cited

U.S. PATENT DOCUMENTS

| | | | |
|---|---|---|---|
| 2,219,329 | 10/1940 | Engels | 426/467 |
| 4,854,227 | 8/1989 | Koopman | 99/416 |

FOREIGN PATENT DOCUMENTS

| | | |
|---|---|---|
| 17 47 795 A1 | 6/1957 | Germany . |
| 18 80 419 A1 | 6/1963 | Germany . |
| 19 76 759 A1 | 1/1968 | Germany . |
| 72 47 152 U1 | 6/1973 | Germany . |
| 26 21 927A1 | 11/1977 | Germany . |
| 35 18 239 C2 | 8/1986 | Germany . |
| 38 39 097 A1 | 6/1989 | Germany . |
| 2 005 524 | 4/1979 | United Kingdom . |
| 93-18349 A1 | 9/1993 | WIPO . |
| WO 95-27399 | 10/1995 | WIPO . |

OTHER PUBLICATIONS

"Garen mit Heissluft und Dampf," [Ovens with Hot Air & Steam] in *Fleisch* [Meat], Oct. 1994 issue, pp. 66–73.

Derwent WPI English abstract of DE 26 21 927, Gerl/Bosch–Siemens, publ. Nov. 24, 1977.

Derwent WPI abstract of DE 35 18 239–C2, Benson +/Heat & Control, pub. Aug. 1986.

*Ullmanns Encyklopädie der technischen Chemie, 4th Ed.* [Ullmans Encyclopedia of Technical Chemistry], "Brot und andere Backwaren" [Bread & other Baked Goods], vol. 8, pp. 721–723 (1974).

"Die vielseitigen Kisten—Backöfen: Für jege Speise die richtige Bedienungsart," [The multifaceted stove—bake ovens: for each dish, the proper treatment] in *der küchenplaner*, May 1985, pp. K5–K8.

*Primary Examiner*—George Yeung
*Attorney, Agent, or Firm*—Milton Oliver; Ware, Fressola, Van Der Sluys & Adolphson LLP

[57] ABSTRACT

An improved process for cooking foodstuffs, e.g. french fried potatoes from a cold initial state, in a hot air oven with a steam phase and a roasting phase, includes the following steps: preheating a refining chamber to a predetermined temperature, introducing the foodstuff to be cooked into a basket mounted for rotation within the refining chamber, switching on a basket-rotating drive, switching on a hot air fan, reheating the refining chamber, refining the foodstuff in the refining chamber, part of the water contained in the foodstuff passing into the ambient atmosphere within the refining chamber, thereby creating an atmosphere of increased moisture (steam phase), replacing the moist atmosphere with relatively drier hot air, thereby beginning a roasting phase, and switching off the heating, fan, and basket-rotating drive when cooking is completed. The cooking process is speeded up by heating the foodstuff during the steam phase to a temperature higher than a dry-air temperature at which the foodstuff burns, heretofore considered the maximum usable cooking temperature.

15 Claims, 5 Drawing Sheets

PROCESS FOR PREPARING FOODSTUFFS IN A HOT AIR OVEN

FIELD OF THE INVENTION

The invention relates to a process for the preparation of foodstuffs such as, for example, chipped potatoes, in a hot air oven.

BACKGROUND

Such a process is known, for example, from Patent Application PCT/SE 93/00204.

In the known processes the interior of a hot air oven is heated to a required temperature. Then the foodstuff to be prepared, for example, deep frozen chipped potatoes, is put into a wire basket which can be introduced into the interior and is thus introduced thereinto.

The interior is then cooled, due to the low temperature and the high thermal capacity of the deep frozen foodstuff. For this reason the oven heating system is switched on and an air flow is created inside the oven by a hot air fan. The hot air flow heats the foodstuff by passing through the rotated wire basket containing the foodstuff. When the adjusted required temperature is reached, normally 230° C. in the case of chipped potatoes, the oven heating regulating system begins to keep the temperature constant. At this temperature the so-called steam phase also begins, in which the foodstuff is refined in the oven atmosphere. The moisture escaping from the foodstuff remains in the interior of the oven and thus produces a damp hot oven atmosphere. In the steam phase the introduced foodstuff is merely refined and not browned, since in view of the high moisture no roasting starts on the surface of the foodstuff.

After a predetermined period in the steam phase, which depends on the mass and temperature of the foodstuff introduced and which can be calculated, for example, from the drop in temperature at the start of the process, the interior or refining chamber of the oven is aerated via an air supply channel and vented via an air discharge channel, so that the moist atmosphere can escape and a dry atmosphere be set up. With the required temperature further maintained, the preceding steam phase is followed by a roasting phase in which the foodstuff to be prepared is browned and made crisp by the roasting operation taking place in the dry atmosphere. On conclusion of the roasting phase the preparation of the foodstuff is completed, the oven heating is switched off and the foodstuff can be removed.

In the catering field the object of the prior art process is to achieve as high a throughput of foodstuffs per apparatus used as possible. To this end the objective is preparation times as short as possible.

SUMMARY OF THE INVENTION

It is therefore an object of the invention so to improve the prior art process as to achieve a shorter preparation time for the foodstuffs.

Since during the steam phase the refining chamber is heated to a higher temperature than the required temperature, the refining process takes place more quickly in the steam phase, without any adverse effect on the quality of the foodstuff, since in spite of the high temperature in the refining chamber no smoke is generated.

Also advantageously the air supply for the exchange of atmosphere at the end of the steam phase is heated to the required temperature, since this avoids any drop in temperature during the transition from the steam phase to the roasting phase. This saves the time required for reheating the finishing chamber to the required temperature for the roasting phase.

After the material for refining has been introduced into the refining chamber, advantageously the period of time is determined which is required to reach the required temperature again. This period of time is characteristic for the mass and temperature of the foodstuff introduced, from which the shortest possible duration of preparation can be calculated.

The length of the steam phase and/or the roasting phase is determined in dependence on the period of time discovered, so a uniform product quality is achieved independently of quantity.

Advantageously the prepared refined material is delivered by the manual withdrawal of the basket, followed by the automatic rotation of the basket through 360°. More particularly advantageously the temperature is between 200° and 270°, more particularly between 240° and 255° during the steam phase and preferably 250° during the majority of the steam phase.

In the roasting phase the temperature should be between 190° and 240°, more particularly between 220° and 235° C., and preferably 230° C. during the majority of the roasting phase. If following the end of the preparation time the material for refining is not immediately removed from the oven, advantageously the heating fan is switched off and the basket is rotated at regular intervals. Lastly, an inputting device such as, for example, a key or a controller can be interrogated, and certain process parameters such as, for example, time and/or temperature can be changed in dependence on the result of the interrogation. A user can therefore vary the texture of the product within certain limits.

BRIEF FIGURE DESCRIPTION

An embodiment of the process according to the invention is illustrated in the drawings, which show:

FIG. 1 the programme steps of a preferred embodiment of the process according to the invention, up to the start of the refining programme, FIG. 2 the step following the process steps shown in FIG. 1, up to the end of the steam phase, FIG. 3 the process steps following the end of the steam phase, to the removal of the prepared foodstuff, FIG. 4 the final process steps for emptying the basket up to the end of the programme, and FIG. 5 the course of temperature during a preparation operation.

DETAILED DESCRIPTION

Figure 1:
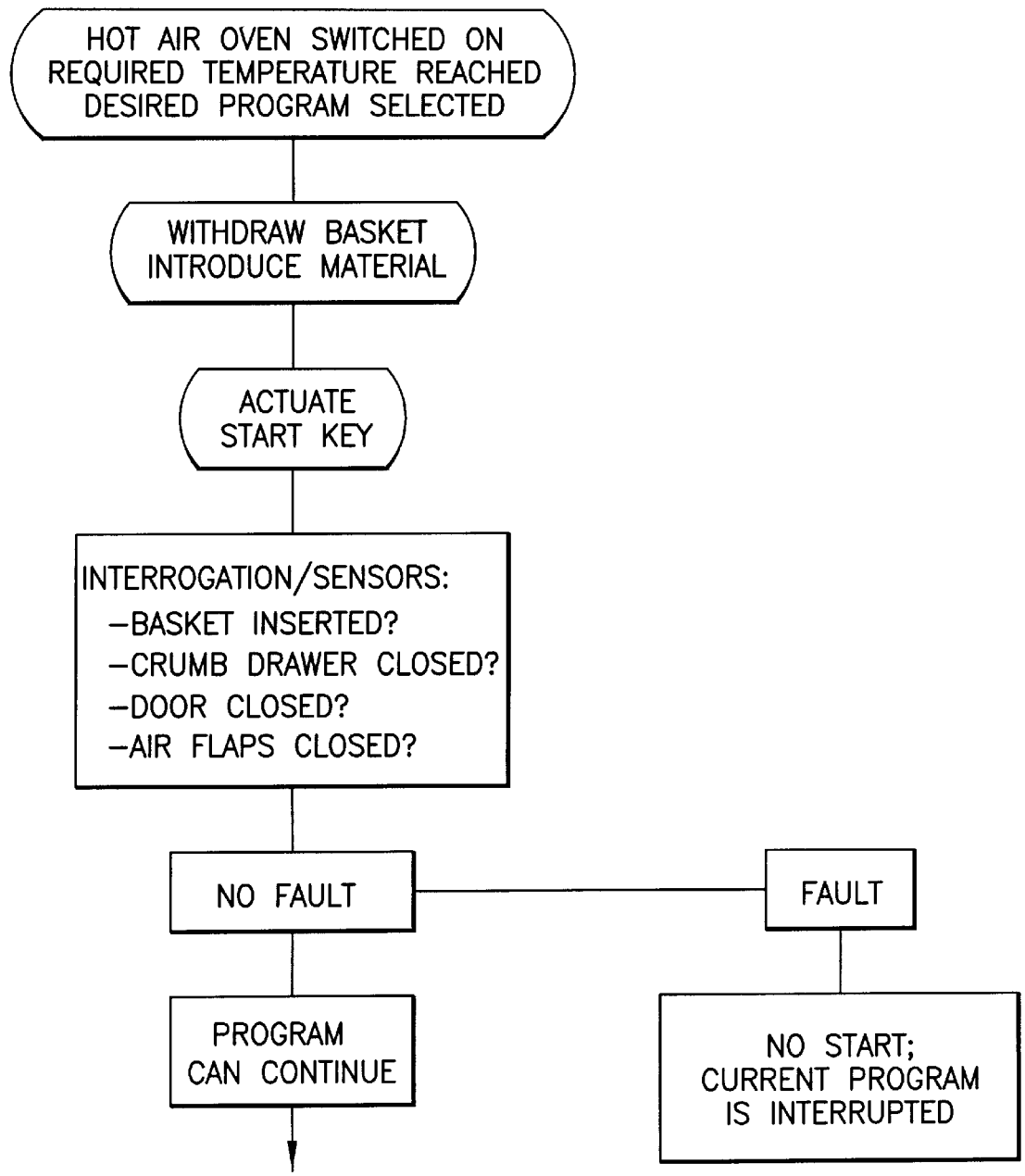
Figure 2:
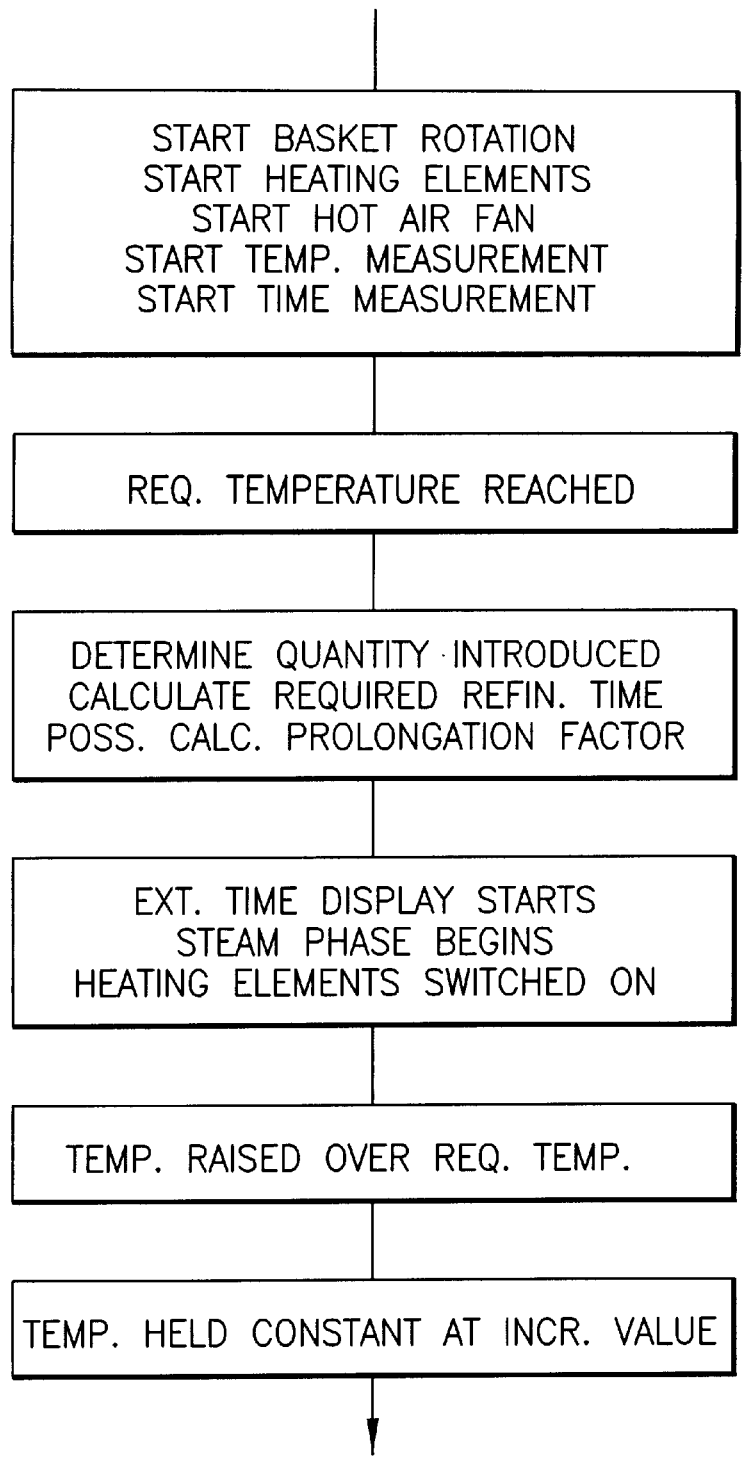
Figure 3:
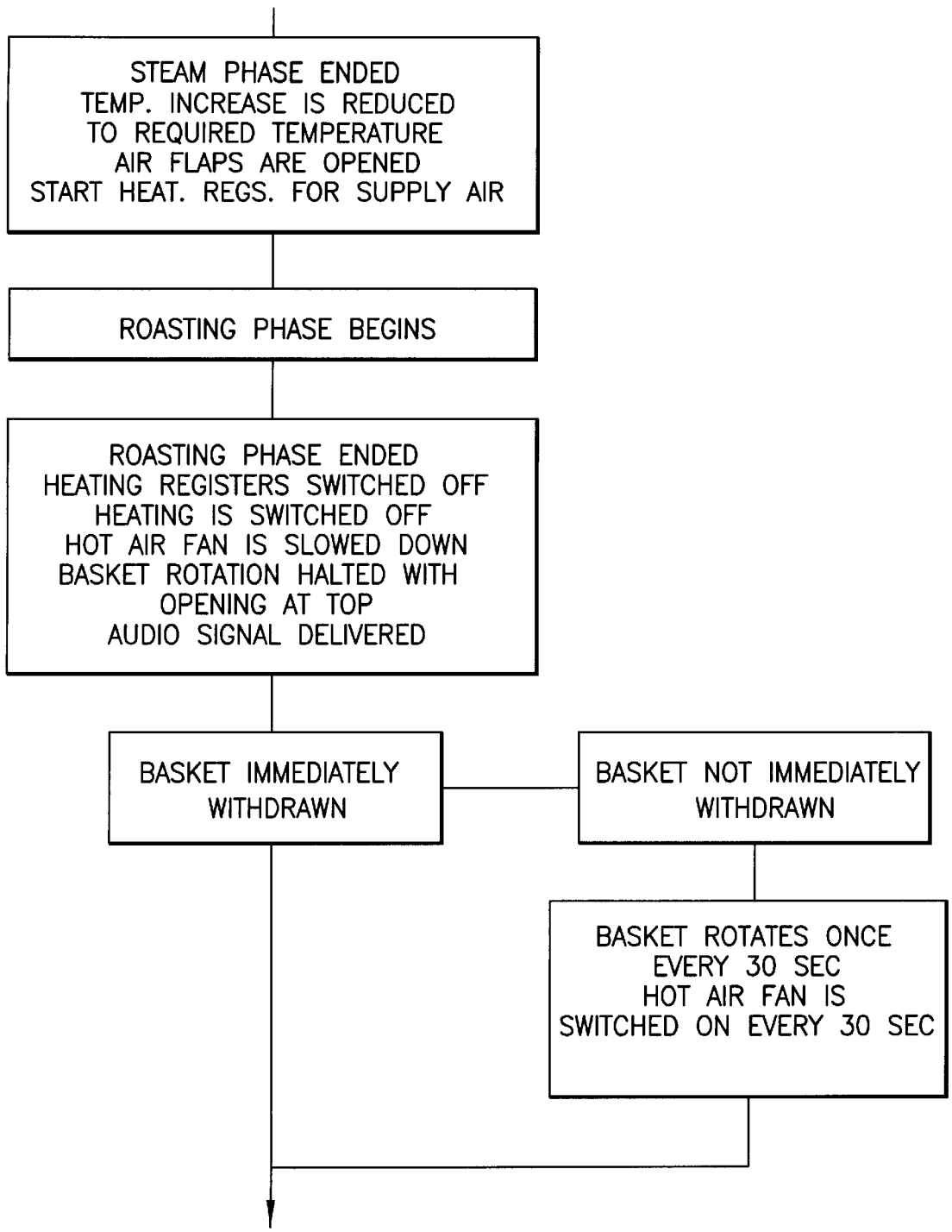
Figure 4:
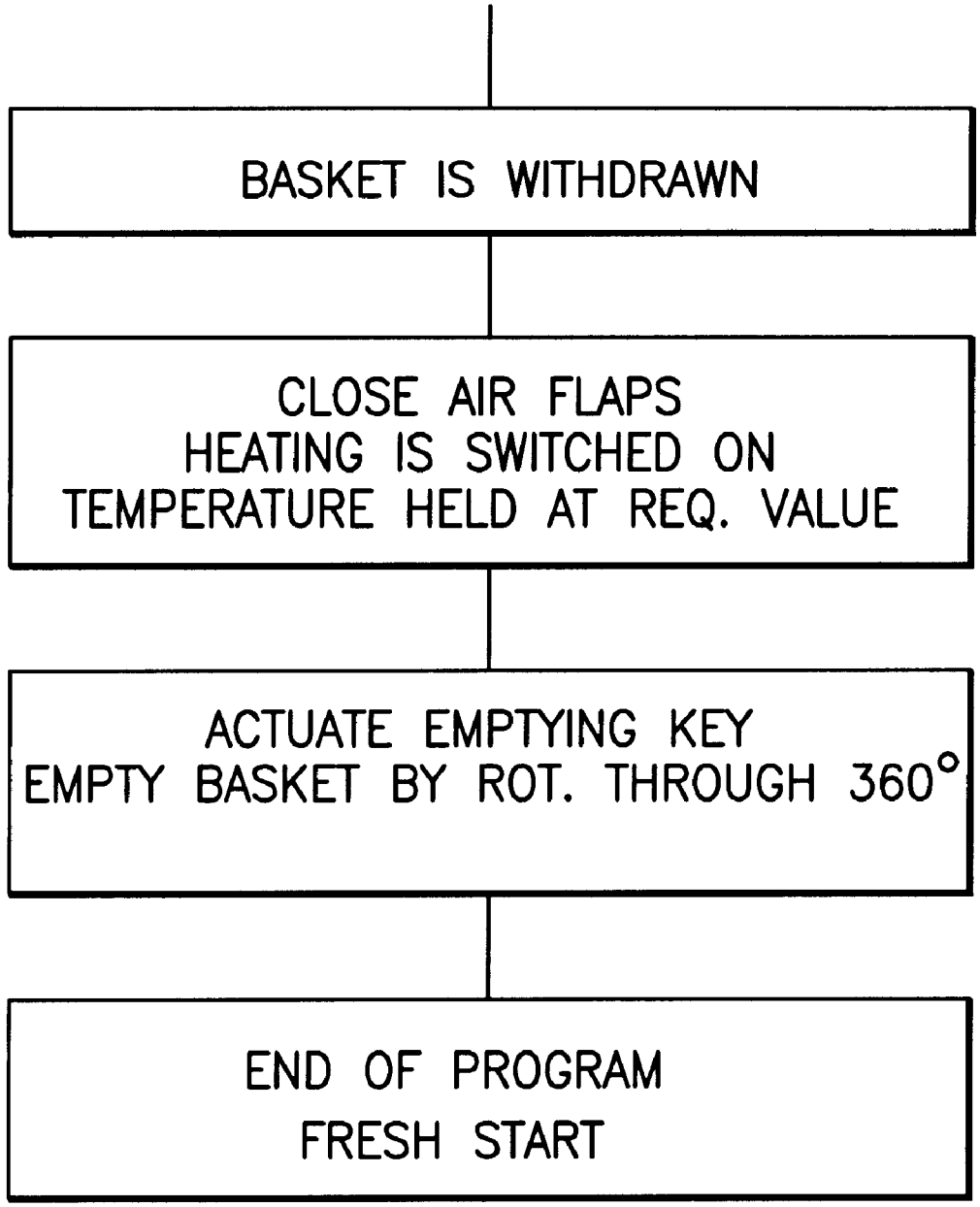

FIGS. 1 to 4 show the entire course of the programme in its essential steps, from the switching-on of the apparatus to the end of the programme after the preparation of the foodstuffs introduced. In a preferred embodiment, at the start of the process according to the invention the hot air oven is first switched on and heated to the required temperature. The operating personnel select from a previously stored programme library the suitable programme in dependence on the kind of foodstuffs to be prepared.

After the required temperature has been reached, the basket for the material for refining is withdrawn from the apparatus and said material is introduced into the basket.

Actuation of the starting key starts the refining programme, a row of sensors first being interrogated. The following determinations are carried out: whether the basket for the material for refining is completely inserted into the apparatus; whether the crumb drawer situated under the apparatus is closed; whether the door the apparatus require for maintenance work is closed; and whether the air flaps leading to the refining chamber of the apparatus are closed.

If the sensors interrogated report a fault, the programme is not started.

If no fault is reported, the required programme begins.

The rotary drive of the basket is switched on. The heating elements provided for maintaining the temperature in the refining chamber are switched on. The hot air fan which conveys the air inside the refining chamber over the heating elements is switched on. The temperature curve in the refining room starts to be recorded, and the time elapsing since the start of the programme is also recorded.

If a predetermined quantity of cold or deep frozen foodstuffs is introduced, inevitably the temperature inside the refining chamber drops below the required temperatures. The quantity of material for refining which has been introduced can be determined and the course in time of the drop in temperature, the minimum temperature which is reached, and the duration until the required temperature is reached again.

When the required temperature is reached, the so-called steam phase begins. Firstly, the refining time required for the quantity of material introduced is calculated, and if necessary in the case of large quantities a prolongation factor is provided which results from the fact that the hot air circulates less efficiently between the individual parts of the material for refining as its quantity increases.

An external time display disposed on the apparatus is started and first indicates the total preparation time still remaining. With the air supply and air discharge flaps closed, the refining chamber is closed in the direction of the outer space, so that the moisture escaping from said material considerably increases the air humidity in the refining chamber. The material is refined in hot steam. At the start of the steam phase the heating elements in the refining chamber are switched on again and the temperature is raised by approximately 20° in comparison with the required temperature which must be maintained during the stand-by phases of the hot air oven and during the roasting phase. Due to the high air humidity during the steam phase, this increase in temperature is harmless to the foodstuff to be prepared and appreciably shortens the duration of the steam phase. The temperature controlling system of the hot air oven holds the temperature at the increased level during the steam phase.

When the steam phase has ended—i.e., when the foodstuff has been refined right to the core—, the temperature increase is reduced to the adjusted required temperature provided for the roasting phase. The air flaps for an air supply channel extending into the refining chamber and also for an air discharge channel are opened, and in the air supply channel heating registers are switched on which raise the air supply temperature already to the required temperature. The roasting phase now starting will continue for the precalculated time, air of the interior being continuously replaced by preheated supplied air, and the moisture still emerging from foodstuffs is removed from the refining chamber by the discharged air. With the dry atmosphere now set up, the foodstuff is browned, thus achieving the preparation results required for proper appearance and the senses.

When the roasting phase has ended, the heating registers in the air supply channels and also the heating in the refining chamber are switched off. The hot air fan is slowed down to a slow speed and the rotation of the basket is halted in the position in which the open top side of the basket is pointing upwards. An audio signal is delivered to indicate to the operating personnel that the preparation process is concluded and the material for refining can be removed. If the basket is immediately withdrawn from the refining chamber, the air flaps are closed, the heating of the refining chamber is switched on again, and the temperature of the refining chamber is brought to the adjusted required value and held at that value. When an emptying key is actuated by the operating personnel, the basket is emptied by being rotated once through 360°, the prepared foodstuff dropping out of the basket. Then the preparation programme is ended and the apparatus is ready for a fresh start of the programme. If after the ending of the roasting phase the basket is not immediately withdrawn from the refining chamber, the basket is rotated once at regular intervals, for example, every 30 seconds, so that the parts of the prepared foodstuff do not cake to one another. The hot air fan is also switched on at regular intervals. When the basket is then finally withdrawn from the apparatus, the concluding process steps for the emptying and stand-by of the apparatus are as already described.

The process described hereinbefore for the preparation of foodstuffs in a hot air oven appreciably economizes preparation time, since in the steam phase the temperature is raised by approximately 20° in comparison with the required temperature in the roasting phase. The temperature in the steam phase is then approximately 250° C., while in the roasting phase the temperature is held at approximately 230° C. The refining process therefore takes place more rapidly in the steam phase, without any adverse effect on the quality of the end product. In contrast, such a high temperature in the roasting phase would considerably spoil the taste and consistency of the product.

In the preferred embodiment of the process according to the invention, preparation time is also saved by the feature that at the start of the roasting phase the air supply is already preheated to the required temperature, but that no drop in temperature caused by the fresh air supplied takes place on entry into the roasting phase.

Figure 5:
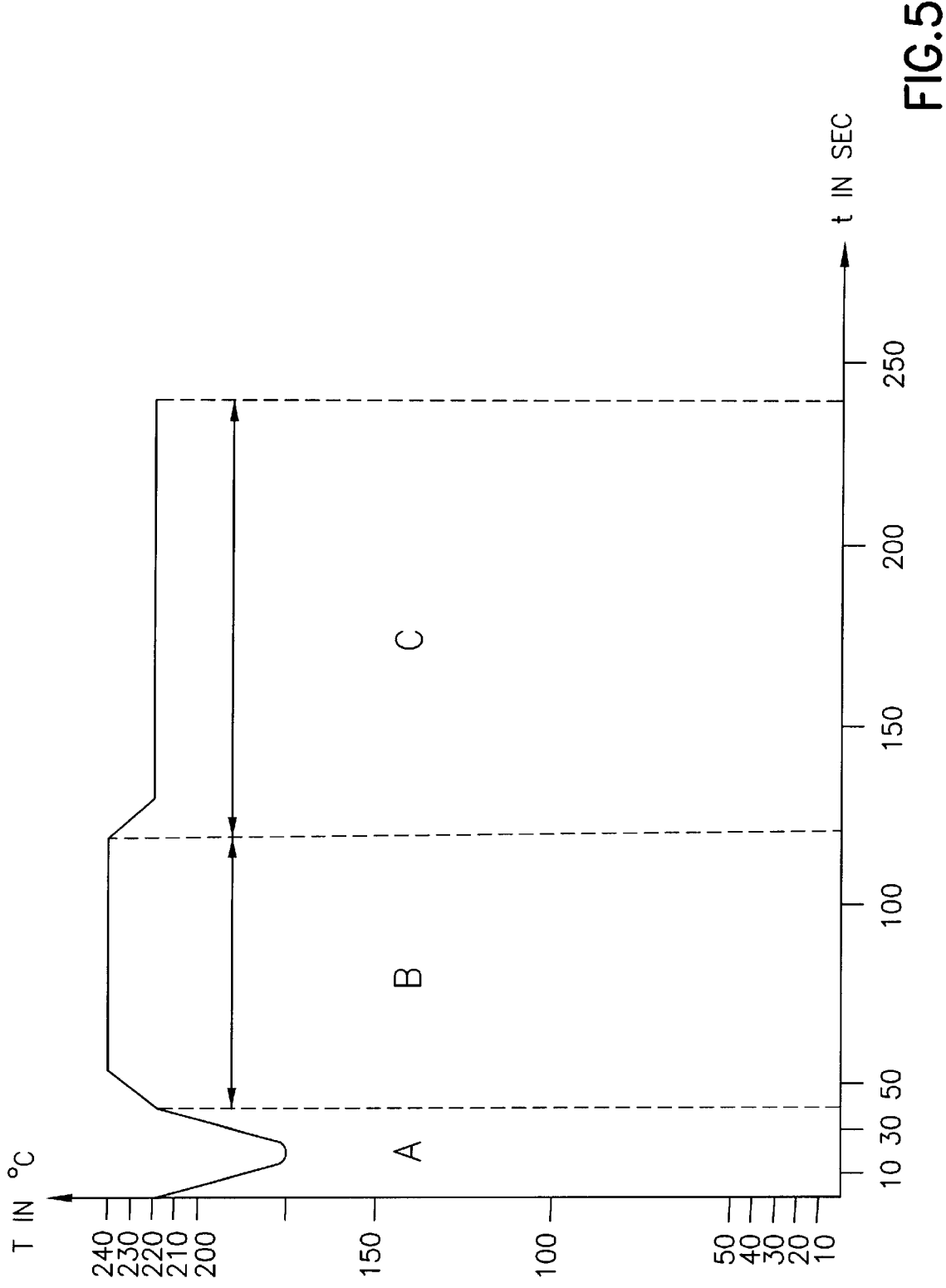

FIG. 5 shows the course of temperature during a preparation operation. In phase A the temperature drops due to the cold foodstuff introduced, whereafter the temperature rises and finally reaches the required value. The length of the phase A is characteristic of the quantity of foodstuff introduced.

Phases B and C characterize the steam and roasting phases respectively, as described in the foregoing text.

What is claimed is:

1. A process for cooking foodstuff material in a hot air oven with a steam phase (B) and a roasting phase (C), comprising the following steps:

preheating a refining chamber to a first predetermined temperature, introducing the foodstuff material into a basket mounted for rotation within the refining chamber, switching on a basket-rotating drive, switching on a source of hot air, reheating the refining chamber, in a reheating phase (A), to a second predetermined temperature, refining the material in the refining chamber in said steam phase (B) by causing part of the water contained in the foodstuff material to pass into the ambient atmosphere within the refining chamber, thereby creating an atmosphere of increased moisture, replacing the atmosphere of increased moisture by relatively drier air at a third predetermined temperature thereby beginning said roasting phase (C), and switching off the heating and basket-rotating drive upon completion of cooking, wherein said second predetermined temperature exceeds said third predetermined temperature, thereby shortening duration of overall cooking time required.

2. A process according to claim 1, wherein said second predetermined temperature during said steam phase exceeds said third predetermined temperature during said roasting phase by about 20° C./36° F.

3. A process according to claim 1, wherein the oven is equipped with a programmable device which controls target temperatures in and duration of each phase of said foodstuff cooking process, and further comprising the steps of storing information in a memory in the device concerning values set for said temperatures and durations, interrogating said memory to retrieve values currently set, and modifying the values set for temperature and durations to vary texture and doneness of the cooked foodstuff.

4. A process according to claim 2, wherein said second predetermined temperature is approximately 250° C./482° F. and said third predetermined temperature is approximately 230° C./446° F.

5. A process according to claim 1, further comprising the step of determining, based upon the magnitude of a temperature drop in said chamber after introduction of said foodstuff material, an estimated duration of said reheating phase.

6. A process according to claim 5, further comprising the step of controlling the duration of the steam phase and of the roasting phase as a function of duration of said reheating phase.

7. A process according to claim 1, further comprising the steps of:

withdrawing the basket from the chamber, and automatically rotating the basket through 360°.

8. A process according to claim 1, wherein the temperature during the steam phase is maintained between 200° C. and 270° C.

9. A process according to claim 8, wherein the temperature during the steam phase is maintained between 240° C. and 255° C.

10. A process according to claim 9 wherein the temperature during most of the duration of the steam phase is maintained at about 250° C.

11. A process according to claim 1, wherein the temperature during the roasting phase is maintained between 190° C. and 240° C.

12. A process according to claim 11, wherein the temperature during the roasting phase is maintained between 220° C. and 235° C.

13. A process according to claim 12, wherein the temperature during most of the duration of the roasting phase is maintained at about 230° C.

14. A process according to claim 7, further comprising the step of:

after withdrawal of the basket from the chamber, rotating the basket at regular intervals, until the cooked foodstuff is removed from the basket.

15. A process according to claim 1, further comprising the step of preheating said drier air above 220° C. before introducing it into said chamber.

* * * * *

UNITED STATES PATENT AND TRADEMARK OFFICE
CERTIFICATE OF CORRECTION

PATENT NO. : 5,928,694
DATED : July 27, 1999
INVENTOR(S) : Ubert & Barthel

It is certified that error appears in the above-identified patent and that said Letters Patent is hereby corrected as shown below:

On the title page, INID [56], Other Publications, at line 12, please change "jege" to --jede--.

In column 2, line 42, please change "step" to --steps--.

In column 3, line 3, after "door" please insert --on-- and please change "require" to --required--.

In column 3, line 18, please change "temperatures" to --temperature--.

Signed and Sealed this

Seventh Day of December, 1999

Q. TODD DICKINSON

*Attest:*

*Attesting Officer*    *Acting Commissioner of Patents and Trademarks*